(12) United States Patent
Jefferson

(10) Patent No.: US 6,412,343 B1
(45) Date of Patent: Jul. 2, 2002

(54) HIGH TEMPERATURE PITOT PROBE COVER

(76) Inventor: Ernest Thaddeus Jefferson, 545 Hubbs Rec Rd., Bel Haven, NC (US) 27810

( * ) Notice: Subject to any disclaimer, the term of this patent is extended or adjusted under 35 U.S.C. 154(b) by 0 days.

(21) Appl. No.: 09/379,154

(22) Filed: Aug. 23, 1999

(51) Int. Cl.[7] ............................................. G01C 21/00
(52) U.S. Cl. ...................................................... 73/182
(58) Field of Search ............................. 73/182, 861.65, 73/861.66; 428/35.2, 35.5, 35.4

(56) References Cited

U.S. PATENT DOCUMENTS 5,127,265 A * 7/1992 Williamson et al. .......... 73/182
6,139,802 A * 10/2000 Niermann et al. .......... 422/102

* cited by examiner

Primary Examiner—Benjamin R. Fuller
Assistant Examiner—Jewel V. Thompson

(57) ABSTRACT

A flame and heat resistant cover for a pitot-static probe has an open end for easy placement over said probe and a gathered end for covering the ram port of the probe. The cover consists essentially of a braided tube of fiber threads and having an open end formed by folding over an end of said tube to form a pocket for receiving a coiled spring carrying an internal annular reinforcing ring having a diameter outwardly engaging the spring to establish initial tensioning and establishing a normal minimal opening therefor, and inwardly engaging the spring to limit the maximum opening therefor. The open end is treated with an impact resisting elastomeric saturant that impregnates said fibers for increasing the abrasion resistance of said fibers during insertion of said cover over said probe. The cover may be formed of flame resistant fibers including heat treated glass fibers and para-aramid fibers.

8 Claims, 2 Drawing Sheets

HIGH TEMPERATURE PITOT PROBE COVER

FIELD OF THE INVENTION

The present invention relates to the protection of pitot static tubes and, in particular, an improved wear and heat resistant probe cover installable over pitot static probes of aircraft.

BACKGROUND OF THE INVENTION

Pitot static tubes are conventionally used on aircraft for measuring speed and altitude. Because of sensitivity and delicacy, such instruments are prone to damage during installation, maintenance, and storage. To avoid such contamination, for any appreciable layover, the pitot static tubes are covered temporarily to prevent dust, particulates and other foreign matter from entering the probe ports. Prior to flight the probe covers are removed.

Many aircraft, primarily commercial, also employ heating devices on the pitot static probes to prevent icing at the probe ports that can adversely effect the accuracy thereof. Failure to remove the covers prior to heating, in addition to disabling the probe, can cause damage to the probe resulting from cover material degradation.

Damage from such inadvertent failure to remove the cover has resulted in the use of fire resistant materials for such protection. As disclosed in U.S. Pat. No. 5,127,265 to Williamson et al., the body of the pitot static tube cover may be a braided material comprised of fiberglass that is pre-treated to remove sizing and organic residue. Such design is currently in commercial usage and does provide protection against thermal degradation in the presence of inadvertent thermal cycles.

Nonetheless, problems of probe contamination can occur with the fiberglass construction during normal and customary usage. Inasmuch as the tubes are made of braided material, they are longitudinally flexible and crimp during insertion and removal. Accordingly, the cover interior tends to abrade and erode in use resulting in fine glass particulates that collect on the interior surfaces of the cover. The gathered, closed tail end of the cover also presents exposed frayed strands that can abrade over time presenting an additional source of particulates. Furthermore, the mouth end of the cover is very difficult to visually align inasmuch as the pitot-static tubes on commercial aircraft may be a considerable distance above ground. Accordingly, the mouth generally impacts the sharp frontal edge of the ram port and significantly degrades with use resulting in yet another source of probe contamination. All such particulates may enter the probe orifices and effect operation and accuracy of the monitoring systems.

In order to overcome such potential problems, installation and removal procedures have been developed to limit abrasive contact between the probe and the cover material. Additionally, the covers are provided with horizontally opposed lifting tabs for use in conjunction with positioning equipment to facilitate installation on larger aircraft wherein direct manual control of the placement is not possible. However the cover is prone to sagging in such prior art covers wherein the stitched seam on the closed end is also horizontally disposed. During installation, even with the above lifting tools, the drooping braided material is abraded by the probe port. In actual practice, however, total compliance and proper placement is not achieved and all parts of the covers degrade over time for the above reasons presenting ongoing problems in assuring that prior to flight probe contamination has not occurred. Still further, the spring at the mouth end of the probe cover has been formed by hooking together the ends of a coiled spring. Such an arrangement produces inherently a non-circular, tear drop shape that is transferred to the assembled cover. This non-circularity further increases the abrasive contact generating a further source of internal particulates that can clog the probe ports. Furthermore, the closed or tail end of the cover is formed by inverting a free end into the cover body and sewing the fabric at a seam. Accordingly, the free end fibers readily unwind and fracture in use generating a further source of particulates. Thus a need continues for a pitot static tube cover that will be thermally resistant, and easily installed and removed using accepted procedures and equipment while withstanding the limitations of periodic irregularities and non-compliance on installation and removal procedures.

Additionally, the above-mentioned glass filament requires time consuming and expensive preprocessing to prepare the braided tube for manufacture. Such preprocessing requires heating the fabric to an elevated temperature to remove residuals and contaminants as well as annealing the fabric to permit cutting and shaping without excessive fragmentation. Thus a further need exists for a pitot static tube cover material resistant to the temperature transients presented by inadvertent heater energization, formable without heat treating, resistant to abrasive filament degradation, and useable in accordance with normal practices without generating particulate contamination.

SUMMARY OF THE INVENTION

The present invention provides an improved pitot static probe cover overcoming the material limitations of the foregoing and withstanding the realities of normal usage. The probe cover is in the form of a tubular braided material selected from woven fibers possessing high thermal stability, strength and abrasion resistance. Para-aramid continuous filaments are particularly well suited for such covers and do not require preprocessing or annealing. Such materials provide substantial thermal protects, have high tensile and abrasive strength, and are readily sized and configured to the shapes required for a variety of probe designs. The problem of impact fragmentation, for both the glass material and the para-aramid materials, is reduced by encapsulating the mouth end of the probe with elastomeric saturant that resists abrasion during misaligned installation. Fragmentation at the closed tail end of the tube due to fraying of the fabric end is reduced by enclosing the ends in a rearward pocket and orienting the stitched seams transverse to the probe lifting loops. The problem of non-circularity caused by the prior art biasing spring are overcome by incorporating a limiting ring inside the spring coils that prescribes circularity and initial biasing while limiting diametrical expansion. In another embodiment, controlled biasing at the mouth interface is provided by wrapped filaments encapsulated in a silicone rubber thereby providing a biasing that does not abate over the service life and is particularly useful in probe designs wherein probe body taper can not be used for retention compression.

Accordingly, it is an object of the present invention to provide a pitot probe cover resistant to abrasive wear while resisting thermal degradation in the presence of applied heat from the probe heaters.

Another object of the invention is to provide a flexible pitot probe cover retaining structural integrity under normal servicing procedures.

A further object of the invention is to provide pitot tube cover having controlled compressive fitting with the pitot tube body for extended periods.

Yet another object of the invention is to provide a cover for aircraft pitot static tube of a high strength braided material not requiring preconditioning and not subject to abrasive wear in usage.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENT

Figure 1:
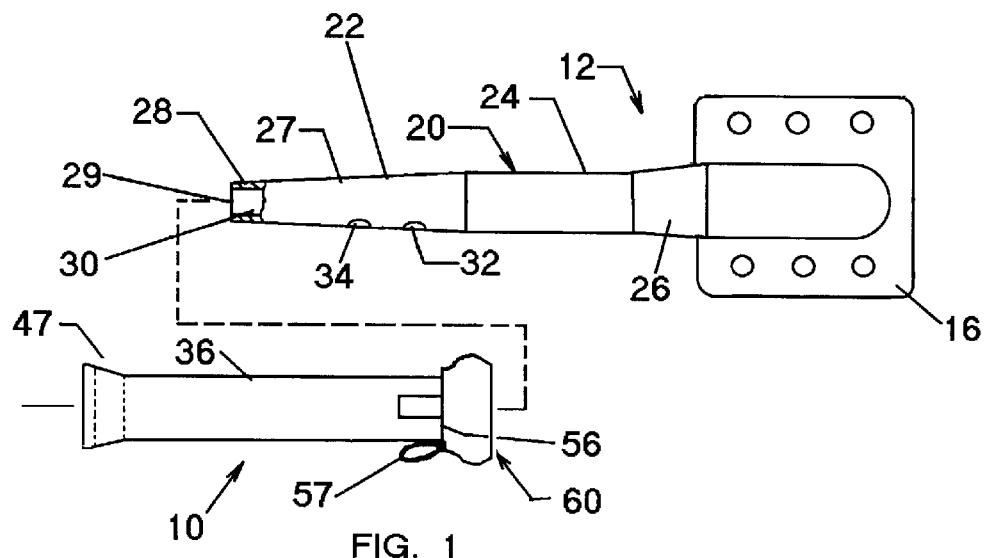
FIG. 1 is a side elevational view of an aircraft pitot tube prior to installation of a probe cover in accordance with an embodiment of the invention.
Figure 2:
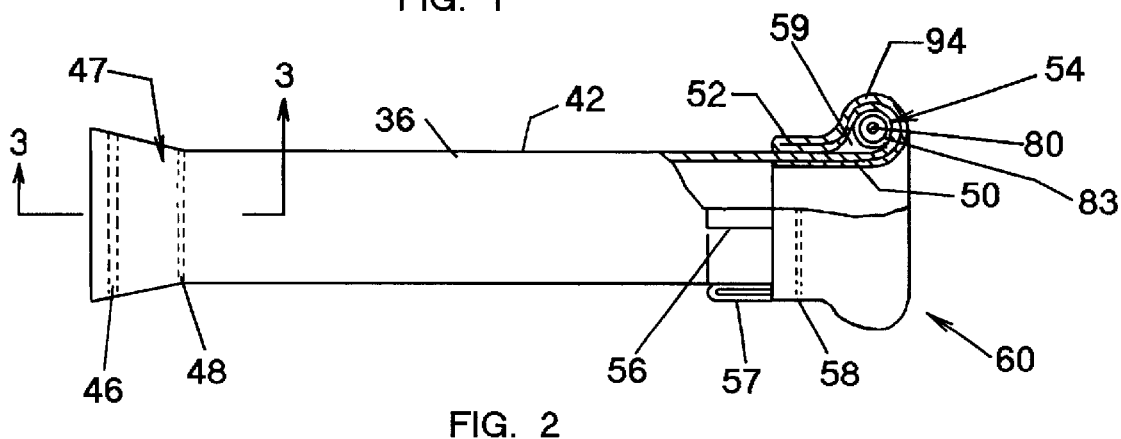
FIG. 2 is a partially sectioned enlarged side elevational view of the probe cover of FIG. 1.

Referring to the drawings for the purpose of describing the preferred embodiments only and not for limiting same, FIGS. 1 and 2 show a high temperature pitot static probe cover 10 adapted to be slidably disposed over the forwardly projecting distal end of a pitot static tube 12 having a base 16 adapted to be conventionally mounted on the nose of an aircraft, not shown.

The main body 20 of the probe 12 comprises a frusto-conical tip section 22, a cylindrical middle section 24 and a conically tapered rear section 26. The tip section 22 includes rounded entrance tip 28 defining a ram pressure port 29 at the entrance for the internal passage 30 in the probe. A main static port 32 and an auxiliary static port 34 are formed radially in the mid portion of the tip section 22. In a conventional manner, the probe 12 is connected to a monitoring system and power supplies for monitoring and determining the speed and altitude of the aircraft. The probe 12 is provided heating elements, not shown, for preventing ice formation thereon or therein.

The cover 10 of the present invention has an installed length at least sufficient to cover the probe 12 from the entrance tip 28 past the static ports 32 and 34. The cover 10 is formed of a single length of woven fiber tubing having an annular mouth with an internal diameter greater than the entrance tip and a gathered end covering the front end of the probe. The cover 10 is a braided tube of continuous length fibers providing high strength and abrasion resistance and elevated temperature stability. As discussed in greater detail below, the cover material may be a glass fiber reinforced material as disclosed in Williamson, or preferably a non-glass para-aramid fiber having abrasion and durability characteristic particularly important in the present environment.

Figure 3:
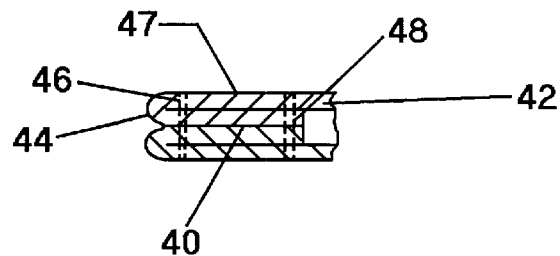
FIG. 3 is an enlarged fragmentary side cross sectional view taken along line 3–3 in FIG. 2.

Referring additionally to FIG. 3, one free end 40 of the tube is hemmed and inverted inside the main body 42 at fold 44 to establish overlapping plies. The fold 44 is flattened and are transversely cross stitched together at an end seam 46 adjacent the forward end of the cover to form the tail 47 of the cover 10. Additionally, a second transverse seam 48 is cross-stitched axially spaced therefrom and adjacent to or beyond the terminus of the fibers of the free end 40. Accordingly, by capturing the free end 40 in a stitched pocket, fraying of the fiber ends is prevented and a heretofore prevalent source of abrasive particulates is avoided.

As shown in FIG. 2, the other free end 50 of the tube body 42 is hemmed inside the main body at folded end 52. Thereafter the folded end is rearwardly folded over a helically coiled double end spring assembly 54 is positioned thereover in a lightly tensioned condition. A pair of lifting loops 56 are provided adjacent the fold and disposed transverse to the stitched seam 46 in the tail 47. A third loop 57 for connection with service identification or the like is disposed at the bottom of the body 42. The folded end 52 is circumferentially stitched at a seam 58 thereby capturing the spring assembly in an annular pocket 59 and attaching the lifting loops 56, 57 to the cover body 42. By having the seam 46 transverse to the horizontal lifting loops 56, the cover is less prone to sagging than prior constructions resulting is lessened abrasive contact during installation.

In such formed condition, the mouth of the cover 10 presents an aperture slightly larger than the entrance tip but smaller than the cross section of the tube in the area of the static ports. Accordingly, as the cover 10 is rearwardly telescoped over the tip section 22 of the probe 12, the cover fabric will expand against the biasing of the spring assembly 54 thereby providing a controlled compressive fit at the installed location.

In the prior art, the cover is radially inwardly biased by a spring is in the form of a double ended extension spring wherein the ends are interconnected. The inherent shape of such connection results in a non-circular, somewhat teardrop shape for the spring. The resultant distortion of the cover mouth 60 increases the abrasion tendencies during insertion over the tube 12 resulting in shards and fragments that can clog the ports 32, 34 and impair the accuracy of the instrumentation. Additionally, such a spring is free to outwardly expand without limits. Accordingly, after a period of usage, the fabric relaxes and the spring does not provide sufficient compression to retain a tight fit over the probe.

Figure 5:
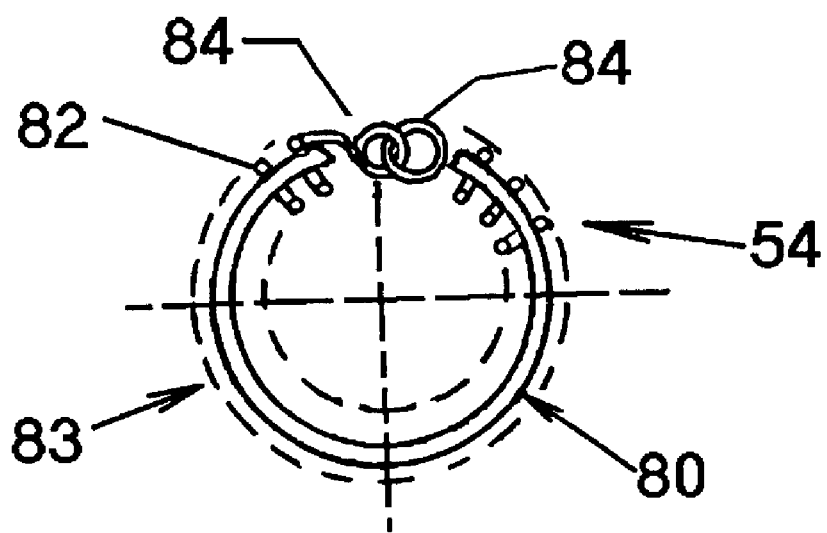
FIG. 5 is a partially sectioned frontal elevational view of a spring biasing assembly for a probe cover.

In the present invention, as shown in FIG. 5, the spring assembly 54 comprises a circular wound retaining ring 80 is retained within the coils 82 of a helical spring 83. The ends 84 of the spring 83 are hooked together. The ring 80 has an outer diameter that engages the outer portions of the coils and establishes the initial circumferential biasing and opening size. With such a construction, the spring is free to expand until the inner coil portions engage the clip 80 thereby limiting further outward expansion of the spring and a resulting maximum opening in the mouth 60 of probe cover 10.

Figure 4:
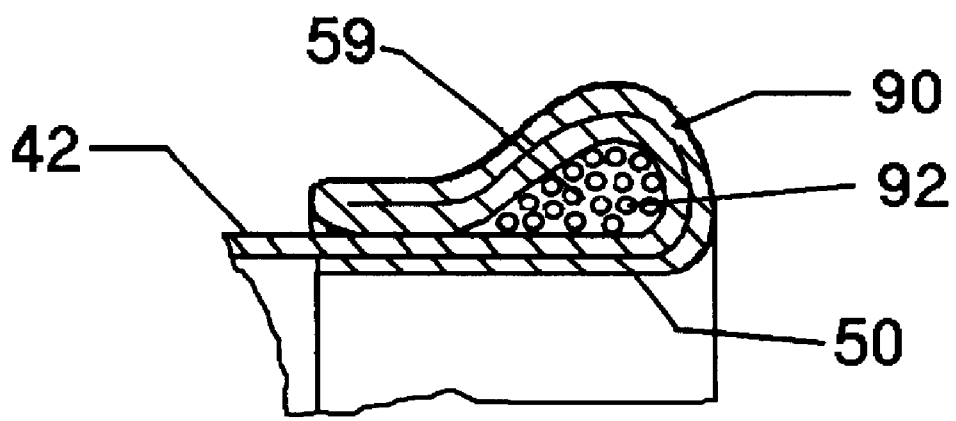
FIG. 4 is an enlarged fragmentary cross sectional view of the mouth of a probe cover in accordance with another embodiment of the invention.

In certain pitot static tubes, the probe, rather than being slightly tapered or frustoconical as described above, is substantially cylindrical and highly polished throughout the ported section and terminates with an unpolished section of slightly increased diameter. With the above spring biasing, it has been determined that over time the probe cover material may develop a partial set and thereby reduce the spring tension to a level where insufficient biasing is provided to maintain the cover securely in place at all times and under prevailing conditions. In a further embodiment as shown in FIGS. 4, this limitation is overcome by providing an encapsulated wrapped stranded band 90 in the folded pocket as a replacement for the spring. To achieve the required relationships, the initial braided fabric tube with an inverted end is telescoped over a mandrel having a cross section corresponding to the pitot tube. A continuous length of high strength, high temperature para-aramid filament 92 is tightly wrapped around the outer surface of the tube for a substantial number of turns and the free ends thereof securely knotted. Thereafter, the wraps are coated with elastomeric saturant to form an encapsulated filamentaceous annulus. The assembly compression during wrapping provides a slight interference fit while the cement provides a limited resiliency and prevents loosening of the strands even after repeated use. A suitable filament is Kevlar or Nomex brand para-aramid continuous filament strands. A suitable elastomeric saturant is silicone rubber.

To reduce abrasive effect during initial insertion of the cover over the probe and provide lubricity, the mouth end of the cover is impregnated with an impact resisting silicone rubber 94 adherent by the fibers. A suitable lubricant is a silicone-based sealant available as Silastic brand silicone rubber, Product No. 9289-50 from Dow Corning Corp.

A further preferred material for the tube cover is braided continuous filament yarn para-aramid organic fibers, particularly including Kevlar brand fibers and Nomex brand fibers, both available from E.I. DuPont de Nemours and Company. Such fibers do not require annealing or pretreatment prior to assembly. Further, such fibers have tenacity, modulus, break elongation, tensile strength properties comparable to glass yarns as well as satisfactory decomposition temperatures for the probe environment. Further, these para-aramid fibers are resistant to the above-mentioned abrasive conditions in the field.

While the present embodiment has been described with reference to the above preferred embodiments, other modifications and changes thereto will become apparent. According, the invention is to be interpreted solely with reference to the following claims.

What is claimed:

1. In a flame and heat resistant cover for a pitot-static probe wherein said cover is characterized by having an open end for easy placement over said probe and a gathered end for covering a ram port of said probe and said cover consists essentially of a braided tube of glass fiber threads heat treated prior to placement on said probe to remove any sizing or organic residue from said glass fiber threads, the open end of said cover being formed by folding over an end of said tube and sewing with fiberglass thread to form a pocket containing a coiled spring, the improvement comprising: an annular reinforcing member carried within the coils of said spring, said reinforcing member having a diameter outwardly engaging the spring to establish initial tensioning and establishing a normal minimal opening therefor, and inwardly engaging the spring to limit maximum opening therefor.

2. In a flame and heat resistant cover for a pitot-static probe wherein said cover is characterized by having an open end for easy placement over said probe and a gathered end for covering a ram port of said probe and said cover consists essentially of a braided tube of glass fiber threads heat treated prior to placement on said probe to remove any sizing or organic residue from said glass fiber, the open end of said cover being formed by folding over said tube to form an annular mouth for receiving said probe, the improvement comprising: an impact resisting elastomeric saturant impregnating said glass fibers at and surrounding said mouth for increasing abrasion resistance of said fibers during insertion of said cover over said probe.

3. The probe cover as recited in claim 2 wherein said elastomeric saturant is a silicone rubber.

4. In a flame and heat resistant cover for a pitot-static probe wherein said cover is characterized by tube having an open end for easy placement over said probe and a gathered end for covering a ram port of said probe, the gathered end of said cover being formed by folding over an end of said tube to form a pocket and sewing with thread to form a pocket, the improvement comprising: a wrapping of heat resistant, high strength filaments in said pocket limiting outward expansion of said open end; and an elastomeric matrix encasing said filaments.

5. The probe cover as recited in claim 4 wherein said elastomeric matrix is a silicone rubber.

6. In a flame and heat resistant cover for a pitot-static probe wherein said cover is characterized by having an open end for easy placement over said probe and a gathered end for covering a ram port of said probe and said cover consists essentially of a braided tube of fiber, the gathered end of said cover being formed by folding over an end of said tube and circumferentially stitching to said cover to form a pocket; and a biasing member retained in said pocket, the improvement comprising; forming said body cover in a braided tube of para-aramid fibers.

7. A flame and heat resistant cover for a pitot-static probe, comprising: a cover body of a braided tube of glass fiber threads, said tube having a gathered closed end formed by inverting an end portion within said cover body to establish a folded hem with ends of said fiber threads terminating therewithin; a first stitched seam extending transversely across said cover body adjacent said hem; and a second stitched seam extending transversely across said cover body and spaced from said first stitched seam to create a pocket substantially capturing said ends of said fiber threads.

8. The probe cover as recited in claim 7 wherein said pocket entirely encloses said ends of said fiber threads.

* * * * *